United States Patent [19]

Leary, Jr.

[11] Patent Number: 5,616,696
[45] Date of Patent: Apr. 1, 1997

[54] AZO DYES HAVING UTILITY FOR INK JET PRINTERS

[75] Inventor: William P. Leary, Jr., Franklin Lakes, N.J.

[73] Assignee: Tricon Colors Incorporated, Elmwood Park, N.J.

[21] Appl. No.: 528,125

[22] Filed: Sep. 14, 1995

[51] Int. Cl.$^6$ .......................... C09B 31/06; C09B 31/12; C09B 31/30; C09B 31/26
[52] U.S. Cl. .......................... 534/667; 534/671; 534/674; 534/840; 534/753; 534/806
[58] Field of Search ................................... 534/667, 671, 534/674, 840, 753 M, 80 C

[56] References Cited

U.S. PATENT DOCUMENTS

| | | | |
|---|---|---|---|
| 1,822,784 | 9/1931 | Oswald | 534/671 |
| 1,904,822 | 4/1933 | Brightman | 534/671 |
| 1,975,611 | 10/1934 | Mendoza | 534/840 |
| 2,270,675 | 1/1942 | Stein et al. | 534/667 |
| 3,544,326 | 12/1970 | Yoshida et al. | 534/840 |
| 4,752,337 | 6/1988 | Kunde | 534/674 X |

*Primary Examiner*—Floyd D. Higel
*Attorney, Agent, or Firm*—Michael L. Dunn

[57] ABSTRACT

A group of compounds comprising the reaction product of a hydroxy naphthylamine sulfonic acid with a diazotized compound comprising, an aromatic azo substituted Cleves Acid such that the diazotized compound is coupled with the hydroxy naphthylamine sulfonic acid ortho to the amine group. More particularly the compounds of the invention comprise a compound having the formula:

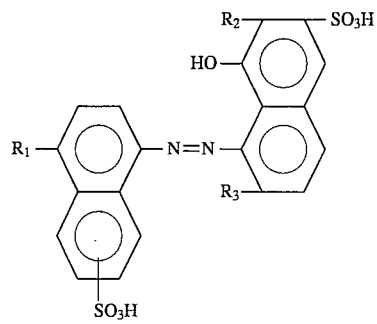

wherein $R_1$ is an aromatic azo radical, $R_2$ is hydrogen or an aromatic azo group and $R_3$ is amino, substituted amino or an aromatic azo group. The invention further includes inks made from such compositions and methods for using such inks in ink jet printers.

5 Claims, No Drawings

AZO DYES HAVING UTILITY FOR INK JET PRINTERS

BACKGROUND OF THE INVENTION

This invention relates to azo dyes, especially such dyes having utility in black printing inks for ink jet printers. An ink jet printing ink must meet stringent requirements. In particular, in aqueous based systems, it must have up to 8% by weight solubility in water and various organic cosolvents; it must have good water bleed resistance to avoid smeared or blurred printed text or images. It must have the desired jet black shade. It must have low toxicity and have good light fastness and it should be easily manufactured from readily obtained compounds to reduce complexities of synthesis while maintaining low cost.

During ink jet printing, dye at the pen resistor can instantaneously reach about 400° C. causing evaporation of some of the water. Cycling to this temperature can occur at a rate up to about 8,000 times per second. The dye must have low "kogation," i.e., buildup of a plaque on the pen resistor in an ink jet printer must be little or none. Such dyes also should not crust at the pen orifice.

In the case of black dyes used to date for ink jet printing, the dyes have not met all of the requirements as well as desired.

As an example, Food Black 2 has been used in black inks for ink jet printers. Food Black 2 has the formula:

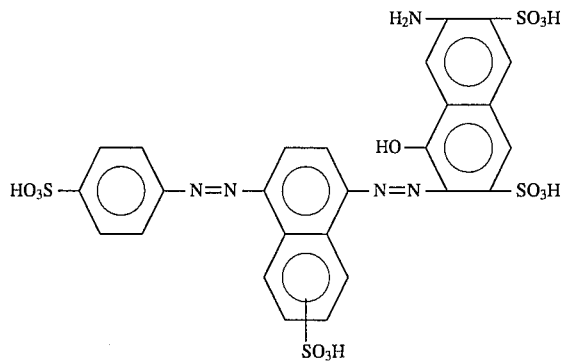

Inks prepared from Food Black 2 certainly have low toxicity and in general give a good jet black color. The water bleed resistance and intercolor bleed resistance of Food Black 2 is tolerable but still not as good as desired and its cost is high.

A major problem with Food Black 2 is that its manufacture requires that Sulfanilic Acid be azo coupled to 1,6 or 1,7 mixed Cleves Acids followed by azo coupling the resulting azo product with RR Acid. Unfortunately RR Acid is a difficult to manufacture and costly intermediate because it is difficult to get the amine group in RR Acid into the β position. As a result the manufacture of RR Acid requires numerous steps, does not usually give good yields when attempted by most persons skilled in the art, and is therefore inefficient and costly.

To avoid the inefficiencies and costs associated with using RR Acid, attempts have been made to make jet black dyes for ink jet printers using Gamma Acid which is much easier to manufacture than RR Acid and is less costly by at least an order of magnitude. Such an attempt has for example been made by making an azo dye using Aminosalicylic Acid azo coupled to 1,6 or 1,7 Cleves Acid or mixtures thereof followed by diazotizing the resulting product and azo coupling to Gamma Acid or a derivative of Gamma Acid. Examples of such dyes are disclosed in U.S. Pat. No. 4,752,337 to Kunde and assigned to Bayer. The reaction, as previously described in U.S. Pat. No. 4,752,337, results in a dye which is unfortunately not nearly as black as desired and which in fact seems to be more nearly a dark brown.

There therefore exists a need for a jet black dye meeting the stringent requirements for ink jet printing while improving its working properties and being easier and less costly to manufacture than Food Black 2.

BRIEF DESCRIPTION OF THE INVENTION

In accordance with the invention there are therefore provided jet black disazo, tetrazo or polyazo dyes having all of the requirements for use in ink jet printing while being much simpler and much less costly to manufacture than Food Black 2.

In accordance with the invention it has been unexpectedly found that, by non-traditional means, a diazotized compound, comprising an aromatic azo substituted Cleves Acid, may be coupled with a hydroxy naphthylamine sulfonic acid ortho to the amine group, providing an entirely new range of products having unique dye characteristics. Some of such products provide all of the requirements of excellent dyes for ink jet printers while being simple to manufacture at relatively low cost.

In accordance with the invention it has been unexpectedly discovered that when Aminosalicylic Acid is azo coupled to 1,6 or 1,7 Cleves Acid or mixtures thereof, followed by azo coupling to 7 amino-1 Napthol-3 sulfonic acid (Gamma Acid) under acidic conditions, the resulting coupling to the Gamma Acid is surprisingly unconventionally sited ortho to the amine group of the Gamma Acid, as opposed to ortho to the hydroxyl group as described in U.S. Pat. No. 4,752,337. And that further the surprising non-traditional coupling ortho to the amine group results in a jet black dye as opposed to a black dye with a brownish hue of U.S. Pat. No. 4,752,337.

Preferred compositions of the invention more particularly comprise a compound having the formula:

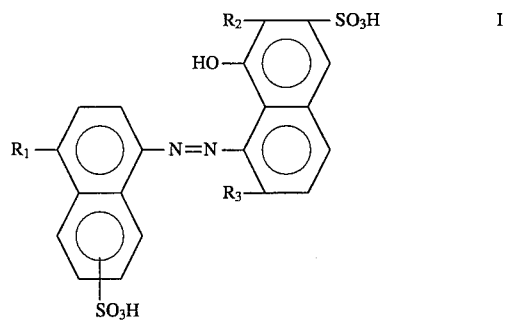

wherein $R_1$ is an aromatic azo radical, $R_2$ is hydrogen or an aromatic azo group and $R_3$ is amino, substituted amino or an aromatic azo group.

The preferred compositions are those compositions where $R_1$ is the radical formed by coupling with diazotized 5 amino salicylic acid to form the compound:

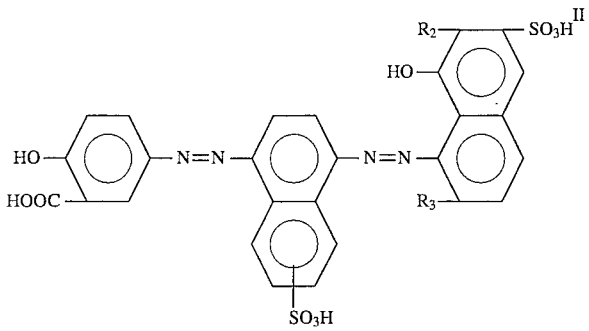

A preferred composition of the invention comprises the compound wherein $R_2$ is hydrogen and $R_3$ is amino.

Another preferred composition comprises the compound wherein $R_2$ is the azo group:

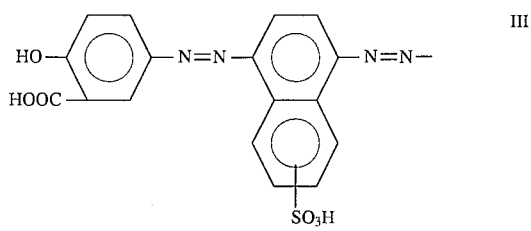

and $R_3$ is amino.

DETAILED DESCRIPTION OF THE INVENTION

In accordance with the present invention and at the heart thereof, a compound is provided comprising the reaction product of a hydroxy naphthylamine sulfonic acid, such as Gamma Acid, H Acid, J Acid, K Acid, S Acid, and SS Acid, with a diazotized compound comprising an aromatic azo substituted Cleves Acid such that the diazotized compound is coupled with the hydroxy naphthylamine sulfonic acid ortho to the amine group.

It has now been demonstrated that such coupling ortho to the amine group largely occurs when the coupling takes place at an acid pH, i.e. less than 7 and preferably about 5 or lower, as opposed to traditional couplings which occur at an alkaline pH which is usually at about 9 or greater.

In a preferred embodiment diazotized aromatic azo substituted Cleves Acid is coupled into the Gamma Acid ortho to the amine group in the Gamma Acid. The substituted Cleves Acid is intended to include 1,6 and 1,7 Cleves Acids and mixtures thereof. The substituted Cleves Acid is intended to include substitutions which do not affect the free amino group and its ability to be diazotized and substituted into Gamma Acid ortho to the amine group of Gamma Acid.

Such substitutions are intended to include azo substitutions into the Cleves Acid para to the amine group of Cleves Acid shown as $R_1$ in the above generic formula. Examples of such substitutions into Cleves Acid para to the amine group of Cleves Acid include radicals resulting from residues of diazotized, 4 or 5 aminosalicylic acid, sulfanilic acid, metanilic acid, para amino phenol, para aminobenzoic acid, para nitroaniline, para chloro-aniline, aminoisophthalic acid and anthranilic acid.

$R_2$ may similarly be a radical resulting from the diazotized compounds above described. $R_2$ may also be a radical resulting from substitution by a diazotized substituted Cleves Acid as previously described or may be hydrogen.

$R_3$ is either the amino group in the original Gamma Acid or is a reacted amino group e.g. a lower alkyl substituted amino group or an azo radical formed by diazotizing the amino group and reacting it with a suitable aromatic structure such as nonyl phenol or other azo couplers known to those skilled in the art.

The following examples serve to illustrate and not limit the present invention:

EXAMPLE 1

Preparation of 5-Amino Salicylic Diazo

5-Amino Salicylic Diazo was made as follows:

Cold water and ice were added to a reaction vessel along with 920 mls. of 36% Hydrochloric Acid. 1225 gms. of 5-Amino Salicylic Acid were charged slowly to the vessel with stirring for 15 mins. to obtain a uniform slurry.

About 600 gms. of sodium nitrite, in water, was then added gradually until all the nitrite was consumed. Conditions are held at T=5±2° C.; pH<1.5. Thereafter, stirring was continued for 0.5–1 hour. If desired, the diazo solution can be used in coupling for the purposes above described. It is preferred to add sulfamic acid to kill residual trace nitrite first.

EXAMPLE 2

Preparation of 5-Amino Salicylic Azo 1,7 Cleves Acid

5-Amino Salicylic Azo 1,7 Cleves Acid was made as follows:

The diazo solution from Example 1 is coupled to 1,7 Cleves acid. 8 gm. mols. of 1,7 Cleves Acid was first put into solution by heating to 50° C. with agitation, adding 50% liquid caustic until the pH=7–8.

The solution of Cleves was then cooled to 5° C., agitated, with addition of 5-Amino Salicylic diazo (from Example 1 above). As the diazo solution was added, sodium acetate was added to maintain pH coupling at 5.2–5.7, with a temperature of 5°–10° C. If needed to hold pH, liquid caustic soda was used. The pH was pushed to 6.6–6.8 to maintain slurry fluidity, and the temperature was allowed to rise to 15°–18° C. at the finish.

EXAMPLE 3

Preparation of 5-Amino Salicylic Azo 1,7 Cleves Diazo

5-Amino Salicylic Azo 1,7 Cleves Diazo was made as follows:

The pH of the resulting product from Example 2 was raised to 9.0–9.9, at a temperature to 20°–25°C. 11% salt (sodium chloride) was then added to the solution which was stirred for 1–2 hours until precipitation was obvious. 620 gms. sodium nitrite in 2 liters of deionized water was then added about 1–10 minutes before diazotizing. The resulting slurry was then slowly added over 0.5 to 2 hours to a cold, hydrochloric acid liquid with stirring. pH was less than 1.5 with a temperature between 5°–8° C. The product was stirred for several hours. The resulting stirred diazo slurry was then filtered and washed with ice water containing 30% salt and hydrochloric acid to obtain a filtered and washed 5-Amino Salicylic Acid 1,7 Cleves Diazo cake.

EXAMPLE 4

Preparation of 5-Amino Salicylic Azo 1,7 Cleves Azo Gamma Acid

5-Amino Salicylic Acid 1,7 Cleves Azo Gamma Acid dye having the formula II wherein $R_2$ is hydrogen and $R_3$ is amino is prepared as follows:

10 gms. of wet gamma acid cake were put into solution with 50% NaOH at room temperature.

One half of a slurry of diazo cake (48.5 gms.) as made in Example 3, was added over 20 minutes to the above Gamma Acid solution, at room temperature. pH was maintained between 5.3–5.7 in this step by addition of 25 ml. sodium acetate and 11 ml. sodium carbonate.

At this point, a compound having formula II where $R_2$ is hydrogen and $R_3$ is amino can be isolated by salting out the dye, washing and drying.

Analytical tests show that the 5-Amino Salicylic Azo 1,7 Cleves Azo group was attached to the Gamma acid ortho to the amine group.

EXAMPLE 5

Preparation of 5-Amino Salicylic Azo 1,7 Cleves Azo Gamma Acid Azo 1,7 Cleves Azo, 5-Amino Salicylic Acid The above dye having the formula II where $R_2$ is III and $R_3$ is amino is prepared as follows:

Prior to salting out, ice and sodium hydroxide were added to the product of Example 4 to obtain a pH of 8.9 and a temperature of 5° C. 48.5 grams of diazo cake as made in Example 3 were then added over a period of two hours. 25 mls. of sodium acetate and 21 mls of sodium carbonate were added to control pH at about 8.9. The resulting azo dye product was salted out of solution with a ten to fifteen percent solution of sodium chloride and was filtered and washed.

EXAMPLE 6

The dyes made in Examples 4 and 5 were made into inks by dissolving 4.5 weight percent dye into deionized water with 10 percent diethylene glycol. The resulting inks were tested on a Hewlett Packard Desk Jet® printer using Gilbert® bond paper. The print was jet black with no brown hues for both inks. For purposes of comparison an azo dye was prepared in accordance with the procedures set forth in U.S. Pat. No. 4,752,337 for obtaining dyes wherein azo couplings are made into 1-hydroxy, 3-sulfo, amino naphthalene rings ortho to the hydroxy group. The same materials were used as in Example 4 except that as taught by U.S. Pat. No. 4,752,337 all coupling reactions occurred at a pH of about 9. The resulting dye when made into an ink as above described and tested on the ink jet printer yielded a color which was not jet black but which had definite brownish tones. Further, neither the resulting ink nor Food Black 2 appeared to have water bleed resistance and edge acuity as good as the inks prepared from the dyes of Examples 4 and 5 of the present invention.

What is claimed is:

1. A composition comprising a compound consisting of the reaction product of a hydroxy naphthylamine sulfonic acid with a diazotized compound consisting of an aromatic azo substituted Cleves Acid such that the diazotized compound is coupled with the hydroxy naphthylamine sulfonic acid ortho to the amine group of the hydroxy naphthylamine sulfonic acid.

2. A composition comprising a compound having the formula:

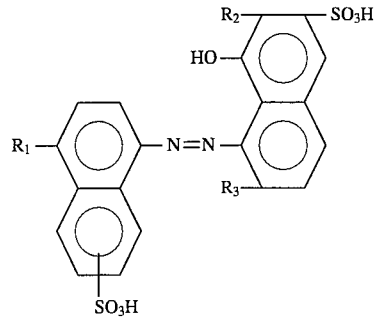

wherein $R_1$ is an aromatic azo radical $R_2$ is hydrogen or an aromatic azo group and $R_3$ is amino, substituted amino or an aromatic azo group.

3. A composition comprising a compound having the formula:

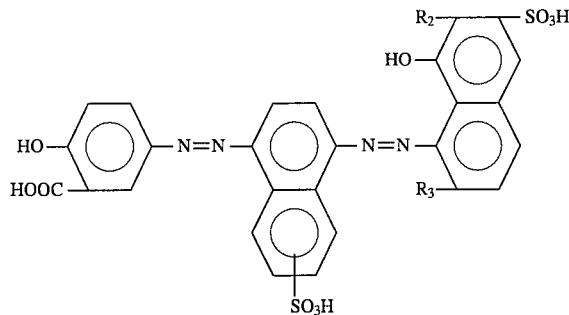

wherein $R_2$ is hydrogen or an aromatic azo group and $R_3$ is amino, aromatic substituted amino or an aromatic azo group.

4. The composition of claim 3 wherein $R_2$ is hydrogen and $R_3$ is amino.

5. The composition of claim 3 wherein $R_2$ is the azo group:

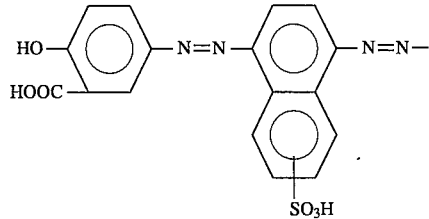

and $R_3$ is amino.

* * * * *